(12) United States Patent
Chocholaty

(10) Patent No.: US 7,924,530 B1
(45) Date of Patent: Apr. 12, 2011

(54) HEAD SUSPENSION HAVING A PUNCHED GIMBAL DIMPLE WITH COINED INCLINED INNER AND OUTER SURFACES ORIENTED AT DIFFERENT ANGLES AND METHOD OF FABRICATING SAME

(75) Inventor: David Chocholaty, Orange, CA (US)

(73) Assignee: Magnecomp Corporation, Murrieta, CA (US)

( * ) Notice: Subject to any disclaimer, the term of this patent is extended or adjusted under 35 U.S.C. 154(b) by 782 days.

(21) Appl. No.: 11/939,683

(22) Filed: Nov. 14, 2007

(51) Int. Cl.
*G11B 5/55* (2006.01)
(52) U.S. Cl. .................... 360/245.1; 29/603.03
(58) Field of Classification Search ............. 360/245, 360/245.1; 29/603.03
See application file for complete search history.

(56) References Cited

U.S. PATENT DOCUMENTS

| 4,167,765 | A | 9/1979 | Watrous |
| 4,700,250 | A | 10/1987 | Kuriyama |
| 5,321,568 | A | 6/1994 | Hatam-Tabrizi |
| 5,493,463 | A | 2/1996 | Hagen |
| 5,636,089 | A | 6/1997 | Jurgenson et al. |
| 5,666,241 | A | 9/1997 | Summers |
| 5,790,347 | A | 8/1998 | Girard |
| 5,921,131 | A | 7/1999 | Stange |
| 6,078,470 | A | 6/2000 | Danielson et al. |
| 6,144,531 | A | 11/2000 | Sawai |
| 6,246,546 | B1 | 6/2001 | Tangren |
| 6,400,532 | B1 | 6/2002 | Mei |
| 6,549,376 | B1 | 4/2003 | Scura et al. |
| 7,256,968 | B1 | 8/2007 | Krinke |
| 7,283,331 | B2 * | 10/2007 | Oh et al. .................. 360/245.1 |
| 7,835,113 | B1 * | 11/2010 | Douglas .................. 360/245.1 |

OTHER PUBLICATIONS

U.S. Appl. No. 11/942,563, Office Action dated Jan. 21, 2011 indicating that claims 1-16, 20, and 23-26 are allowed.
U.S. Appl. No. 11/942,563, most recently filed Amendment dated Jan. 24, 2011, reproducing allowed claims.

\* cited by examiner

*Primary Examiner* — A. J. Heinz
(74) *Attorney, Agent, or Firm* — Intellectual Property Law Office of Joel D. Voelzke

(57) ABSTRACT

A punched gimbal dimple with a coined, frusto-conical base in a head suspension and a method for producing such a dimple. The dimple has an apex and a base, the base having outer and inner surfaces which generally conform to conical frustums. The conical frustum half-cone angles differ by at least 2 degrees. The dimple and its coined base are fabricated by a dimple punch and die with mismatched punch tangent and chamfer angles. The coined dimple base can be more easily seen by optical systems for aligning a slider to the dimple.

18 Claims, 10 Drawing Sheets

HEAD SUSPENSION HAVING A PUNCHED GIMBAL DIMPLE WITH COINED INCLINED INNER AND OUTER SURFACES ORIENTED AT DIFFERENT ANGLES AND METHOD OF FABRICATING SAME

CROSS-REFERENCE TO RELATED APPLICATIONS

Not Applicable

BACKGROUND OF THE INVENTION

1. Field of the Invention

This invention relates to the field of disk drive storage devices. More particularly, this invention relates to the field of forming a gimbal dimple for supporting a read/write head on the end of a disk drive suspension.

2. Description of Related Art

A disk drive generally uses a spinning storage medium (e.g. a disk) to store data. A read/write head is positioned in close proximity to the disk by a suspension assembly. In a hard disk drive, a suspension assembly commonly refers to the combination of a slider/head, containing the read-write transducer circuitry affixed to the distal end of the suspension. The suspension supports the read/write head by a gimbaling means so that the read/write head can pitch and roll. Pitch and roll are required to compensate for disk surface imperfections and aerodynamic forces caused by the wind of a rapidly spinning disk. One such gimbaling means is through a flexible piece of metal, a flexure, perched on top of gimbal dimple.

A head suspension generally comprises a load beam and a flexure. The flexure is located at the distal end of the load beam, which overhangs a disk. A flexure may be a separate part which is welded to a load beam or may be integrally formed in the load beam. Commonly, the part of the flexure which is perched on top of a gimbal dimple is an inwardly cantilevered pad, or tongue. The flexure is otherwise mounted rigidly to the load beam.

The gimbal dimple, sometimes referred to as a load point dimple or dimple, may be formed from the material of the flexure or the material of the load beam. Either material may be referred to as a dimple substrate or substrate. In operation, the protruding surface of the dimple abuts a flat engagement surface of the opposing part. For example, if the gimbal dimple is formed from the material of the load beam, then the opposing part is the flexure tongue. If the gimbal dimple is formed from the material of the flexure, then the opposing part is the load portion of the load beam. The flat engagement surface of the opposing part is designed to rock and sway around the dimple surface yet stay abutted to it. The means of measuring the contact force of this abutment is described in published application US2005/0005425, filed May 17, 2004, and entitled "Method and apparatus for HDD suspension gimbal-dimple separation (contact) force measurement," now abandoned. To promote even gimbaling, the surface around the apex of the dimple is sometimes spherically radiused.

A gimbal dimple can be formed by masking and partially etching the surface of the substrate, or it can be formed by plastically deforming the substrate using a dimple punch and die. The remainder of this discussion will pertain to a punched dimple.

A punched dimple has a protruding side or surface, which is generally convex. The protruding surface can be referred to as the outer surface. A punched dimple, unlike an etched dimple, has a recessed side or surface on the opposite side from the protruding surface. The recessed side is generally concave. The recessed surface can be referred to as the inner surface.

As stated, a gimbal dimple can be formed using a dimple punch and die. Both a dimple punch and a die are typically precision machined tools which are part of a larger fabrication machine. The two tools typically act in concert with a pressure pad or plate which holds a workpiece, such as a gimbal substrate, in place. A workpiece can include any plastically deformable material, such as stainless steel.

A dimple punch, sometimes simply called a punch, is typically an elongated, hardened steel with a rounded tip at one end. The rounded tip may have a precise spherical radius, or it may take the form of other rounded shapes. Typically, the rounded tip of the tool smoothly transitions into a conical tapered body. The surfaces of the tip and tapered body are commonly the work surfaces which contact the workpiece.

A die is sometimes referred to as a form die, gimbal form die, female form die, or dimple form stripper insert. A dimple form die is typically a hardened steel tool with a hole in its otherwise flat work surface. To form a dimple in a workpiece, the workpiece is clamped over the hole in the die using a pressure pad or plate. The dimple punch is then punched into the workpiece directly over the die hole. The recessed surface of the dimple is formed on the side in which the dimple punch is punched, and the protruding surface is formed in the die hole.

The hole in the die can be a through hole or a blind hole. A through hole, or thru hole, is a hole through the entire depth of the die. A through hole may also refer to a hole through a substantial portion of the die, such that the apex of the outside surface of a dimple will not touch the bottom of the hole during the punching process. In contrast, a blind hole is a relatively shallow hole, such that the apex of the outside surface of a dimple will touch the bottom of the hole during the punching process. Either type of hole may be generally cylindrical, having been drilled from the die body, or shaped in other ways by precision machining. Dies with through holes or blind holes can be referred to as through hole dies or blind dimple dies, respectively.

One problem encountered in the prior art is that the gradual transition of a dimple from the plane of the substrate where it is formed makes rounded dimples difficult for optical systems to precisely locate. Optical and vision systems are known to be used to mount and align head sliders to flexures, and it is critical to such systems that they can precisely locate gimbal dimples in order to ensure proper location and alignment of the head slider. The rounded shape of current dimples does not always create a sharply defined profile that is easily sensed by an optical system.

A partial solution to this problem is to use a blind dimple die when punching a gimbal dimple. Blind dimple dies tend to produce shinier, more reflective dimples, which are easier for optical systems to see. However, there are drawbacks to using blind dimple dies. A blind dimple die is more difficult to fabricate than a through hole die. A blind hole has a precise 3-dimensional contour, such as a spherical radius, on its bottom. A 3-dimensional contoured bottom requires time and labor to fabricate and quality check. In contrast, a through hole has no bottom. Also, a blind dimple die is more difficult to resurface than a through hole die. If the top surface of a blind dimple die is ground down for resurfacing, then its blind hole must be deepened by an equivalent amount. Again, a through hole has no bottom. Thus, a blind dimple die is not necessarily an optimal solution in comparison with a through hole die.

Another problem with the prior art is that punching a substrate often has the side effect of distorting the otherwise flat substrate surrounding the punched area. Thus, the periphery around a punched dimple along with the area outside the periphery can have distortions. The varying rate of planar change can affect the height of a lift tab at the end of a load beam and increases component variability. It is preferable to minimize such variability.

There is a need for an improved gimbal dimple in a head suspension and an improved method for making such a dimple. Specifically, there is a need for a dimple which is easier for optical systems to locate. Preferably, such a dimple would be formed using a through hole die but have the increased reflectivity of a dimple formed using a blind dimple die.

Also, there is a need for a punched gimbal dimple whose periphery and area outside the periphery is flatter than those of the prior art.

SUMMARY OF THE INVENTION

The present invention is an improved dimple and a method of forming the dimple for use in a disk drive head suspension.

In a first aspect, the invention includes a gimbal dimple produced with a "coined," area in its base. The coined area can be produced by a dimple punch and die with mismatched surfaces. In particular, the mismatch is between: (1) a surface on the dimple punch defined by a punch tangent angle and (2) a surface on the chamfer of a die hole defined by a chamfer angle. As surfaces on solids of rotation, the surface on the dimple punch is frusto-conical, and the chamfer surface is frusto-conical. The angles are mismatched by at least 2 degrees, with 7 degrees yielding good results. When a substrate, such as a load beam or a flexure, is punched using the dimple punch and die, a dimple is typically produced with a signature frusto-conical outer surface and a frusto-conical inner surface having different half-cone angles from one another.

In a second aspect, the invention includes a gimbal dimple produced with a coined area on its periphery. The coined periphery, which is on the flat part of the substrate and outside the perimeter of the dimple, can be produced using a dimple punch and a die with a raised coining surface. The raised coining surface may be annular and concentric with a cylindrical die hole. When a substrate is punched with the dimple punch and die, a dimple is typically produced with a signature coined periphery. The coined periphery can be exceptionally flat, having a peak-to-valley (PV) flatness of no greater than 3 µm, or even 2 µm. Because the periphery remains flat after the dimple is punch formed, the area beyond the periphery also remains flat.

The improved dimple provides a number of advantages over current and prior art head suspension designs. One advantage is that the improved gimbal dimple is relatively easy for optical systems to locate. In the present invention, substrate material is coined on the dimple's base and/or periphery. Coining a material produces a lower surface roughness average (Ra) than the material around it. A lower roughness average translates to a higher reflectivity. Thus, the dimple's base or periphery has a reflective, shiny ring. The shiny ring is easier for optical systems to locate. The dimple's apex can be calculated from the center of the ring.

Another advantage is that a through hole die can be used to fabricate an improved dimple. Yet another advantage is that the substrate material on the periphery of a dimple stays relatively flat upon punching the substrate.

Exemplary embodiments of the invention will be further described below with reference to the drawings, in which like numbers refer to like parts.

DETAILED DESCRIPTION OF THE PREFERRED EMBODIMENTS

Figure 1:
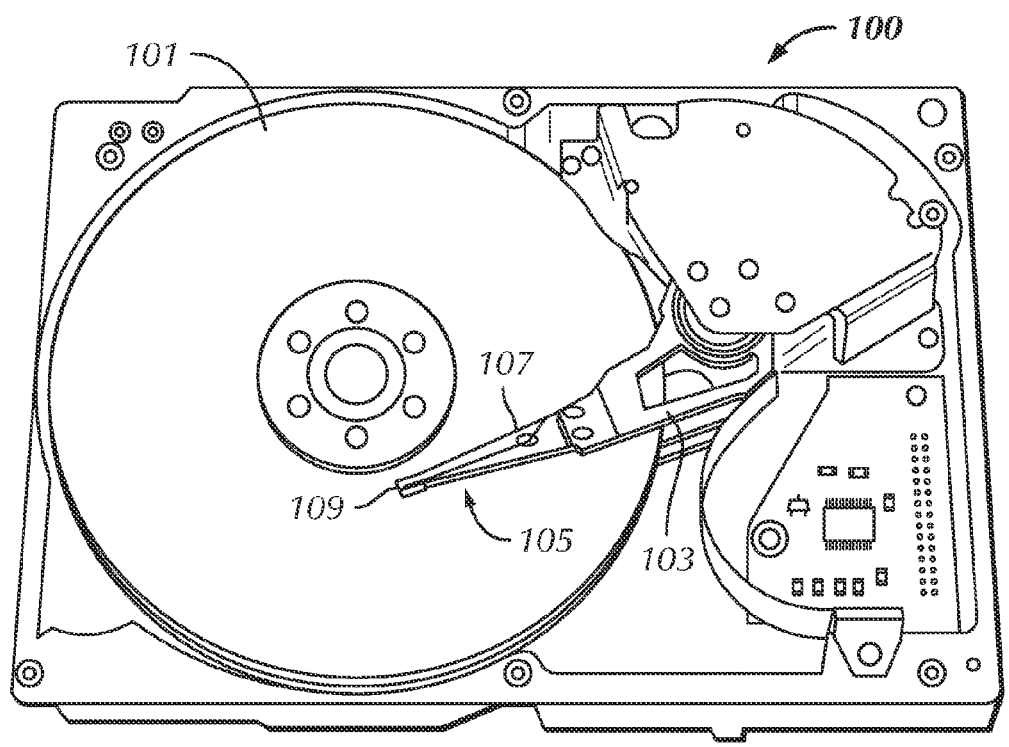
FIG. 1 is a simplified diagram of a hard disk drive according to an embodiment of the present invention.

With reference to FIG. 1, a typical hard disk drive 100 includes at least one data storage disk 101 (e.g., one, two, three, or more disks), at least one actuator arm 103 (e.g., one, two, three, or more actuator arms), and at least one suspension assembly 105 (e.g., one, two, three, or more suspension assemblies). Each suspension assembly is composed of a head suspension 107 and a slider 109. This diagram, as well as other diagrams provided herein, is merely an example, which should not unduly limit the scope of the claims herein. One of ordinary skill in the art would recognize many other variations, modifications, and alternatives.

Disk 101, commonly called a platter, rotates about a fixed axis (or spindle) from about 5,000 rpm up to about 15,000 rpm depending upon the drive. Disk 101 stores information and thus often includes a magnetic medium such as a ferromagnetic material. However, it can also include optical materials, commonly coated on surfaces of the disk, which become active regions for storing digital bit information.

The aggregate storage capacity of disk 101 will vary with track density and disk diameter. Disk 101 stores information in tracks which can typically range from about 50,000 tracks per inch (TPI) to about 200,000 TPI, or more. The diameter of disk 101 can be 5.12 inches (e.g., for a 5.25 inch drive), 3.74 inches (e.g., for a 3.5 inch drive), or less than 2.5 inches, or even less than 1.8 inches or 1.0 inch, or other sizes.

Suspension assembly 105, which overlies (or underlies) a surface of disk 101, operates and controls the head/slider 109 coupled to a read-write transducer circuitry (not shown). Slider 109 is attached to suspension assembly 105 which is in turn is connected to actuator arm 103. Actuator arm 103 is connected to a voice coil motor or VCM, which moves suspension assembly 105 about a pivot point in an annular manner. The VCM can move at frequencies from DC up to about 1 kHz. Preferably, for higher track density, e.g., 200,000 TPI, the control bandwidth can approach 5 kHz, but can also be greater in certain embodiments.

Figure 2:
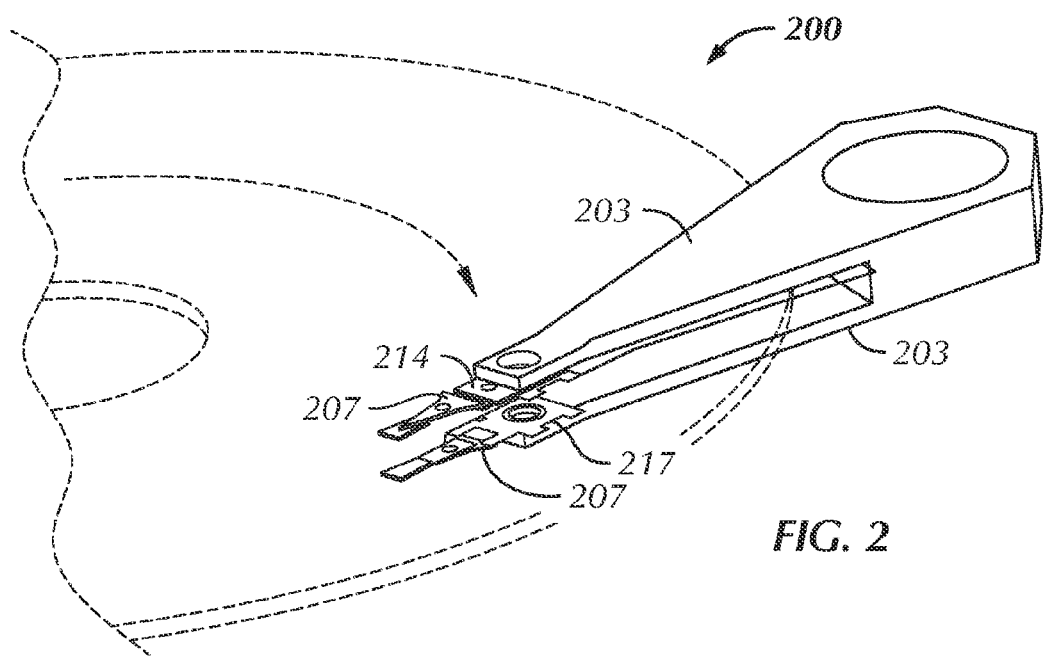
FIG. 2 is a simplified view of an actuator arm assembly with a head suspension according to an embodiment of the present invention.

With reference to FIG. 2, actuator arm assembly 200 can include one, two, three, or more actuator arms. In this embodiment, actuator arm assembly 200 includes actuator arms 203. At a distal portion of each actuator arm 203, base plates 214 (or mounting plates) connect head suspension 207 to each actuator arm 203 via hinge members 217, which can be constructed with a proximal portion providing for actuator coupling (via a base plate or, alternatively, directly to an actuator arm). Hinge member 217 provides the needed spring relationship between head suspension 207 and actuator arm 203. Each hinge member 217 can be comprised of a springing metal layer, or any other material providing a suitable spring relationship between head suspension 207 and the actuator arm 203.

Figure 3:
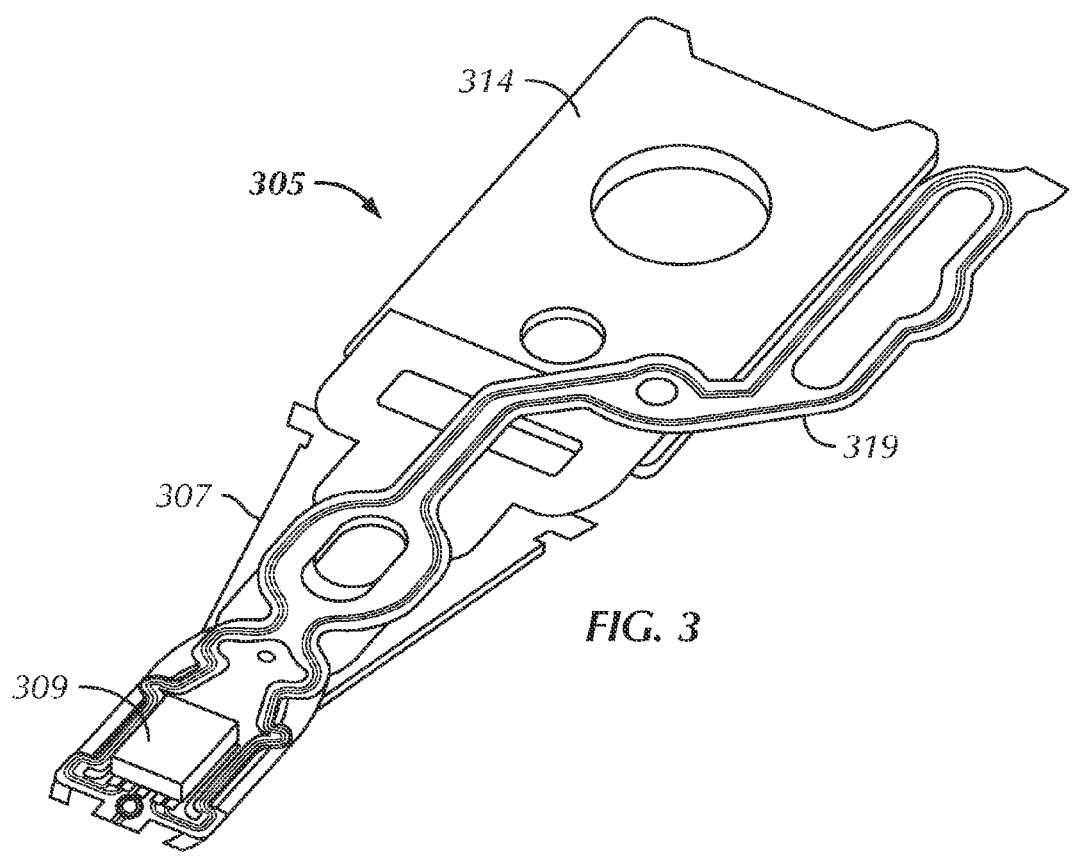
FIG. 3 is a simplified view of a suspension assembly with a head suspension according to an embodiment of the present invention.

FIG. 3 shows a simplified view of a suspension assembly 305, complete with a base plate 314, head suspension 307, and slider 309. Overlaid on the suspension assembly are trace conductors 319.

Figure 4:
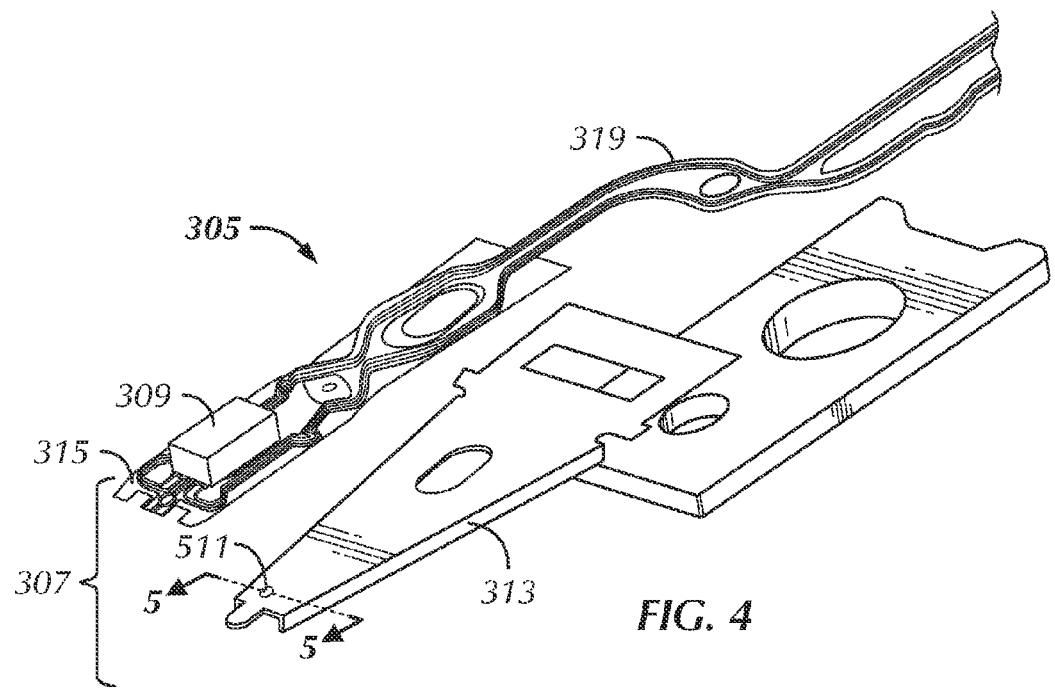
FIG. 4 is an exploded view of the suspension assembly in FIG. 3.

FIG. 4 shows an exploded view of the suspension assembly shown in FIG. 3. Head suspension 307 is shown split apart, with load beam 313 and flexure 315 separated. In this embodiment, dimple 511 is shown on load beam 313 of the head suspension. A flexure 315 of head suspension 307 holds slider 309. Overlaid on load beam 313 and flexure 315 of head suspension 307 are trace conductors 319.

Figure 5:
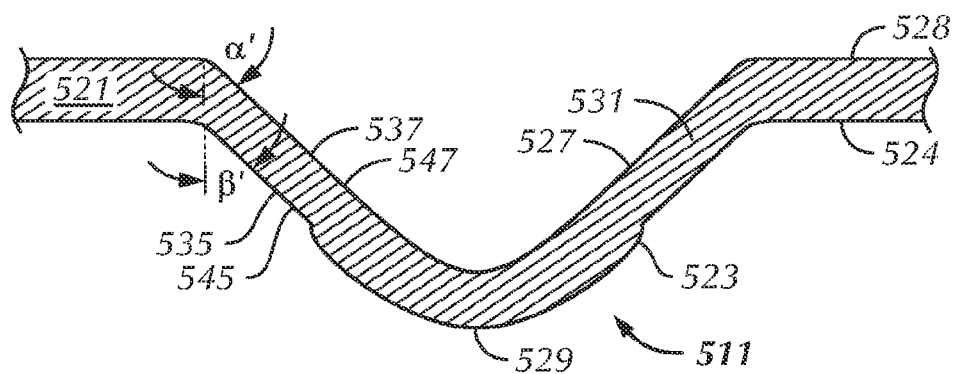
FIG. 5 is a cross-section view along the 5-5 plane of FIG. 4.

FIG. 5 is a cross section through line 5-5 of dimple 511 in FIG. 4. Gimbal substrate 521 may be a load beam (as shown in FIG. 4), a flexure, or other suitable structure in which a gimbal dimple can be formed. Dimple 511 has a protruding side 523, which is sometimes referred to as a protruding surface, outer surface, or outer side. Dimple 511 is located on a first side 524 of substrate 521. Dimple 511, which is a punched dimple, also has a recessed side 527, which is sometimes referred to as a recessed surface, inner surface, or inner side. Recessed side 527 of dimple 511 is located on a second side 528 of substrate 521 opposite first side 524 of substrate 521. Dimple 511 includes an apex 529 and a base 531.

The inner and outer surfaces of the base generally conform to that of the circumferential or outer surfaces of right circular conical frustums. A right circular conical frustum, herein referred to as a conical frustum, is a cone with its point sliced off with a plane parallel to its base. A conical frustum has a half-cone angle, which is defined as the angle between a longitudinal axis of the conical frustum and a longitudinal line along the circumferential surface.

The term, "conical frustum," as used in this specification and the claims below refers to the general shape of a conical frustum, and not a precise mathematical shape. Imperfect conical frustums fall under this definition, such as lopsided, oblique, or squashed conical frustums. Other frustums, such as those resembling pyramids or tetrahedrons, or those with pentagon, hexagonal, star or other multi-faceted shapes also fall under this definition.

Because the inner and outer surfaces of the dimple base generally conform to that of circumferential surfaces of conical frustums, one can refer to the two surfaces as a frusto-conical outer surface 535 and a frusto-conical inner surface 537.

Frusto-conical outer surface 535 has a frusto-conical outer half-cone angle $\beta'$, and frusto-conical inner surface 537 has a frusto-conical inner half-cone angle $\alpha'$. The reference characters $\alpha'$ and $\beta'$ have prime designators because they can be produced from tools having corresponding angles $\alpha$ and $\beta$. In this first aspect of the present invention, the frusto-conical outer and inner half-cone angles $\beta'$ and $\alpha'$ are different from each other by several degrees (deg).

The cross section shows a generally straight outer incline 545 on frusto-conical outer surface 535, and a generally straight inner incline 547 on the frusto-conical inner surface. Similarly, an outer incline angle $\beta'$ is the same as frusto-conical outer half-cone angle $\beta'$, and an inner incline angle $\alpha'$ is the same as frusto-conical inner surface half-cone angle $\alpha'$. In this first aspect of the present invention, incline angles $\beta'$ and $\alpha'$ are different from each other by several degrees.

One skilled in the art would appreciate that a generally straight incline includes inclines that are more or less straight, in that they do not deviate beyond a perpendicular distance from a straight incline of more than 10% of the incline length.

Figure 6:
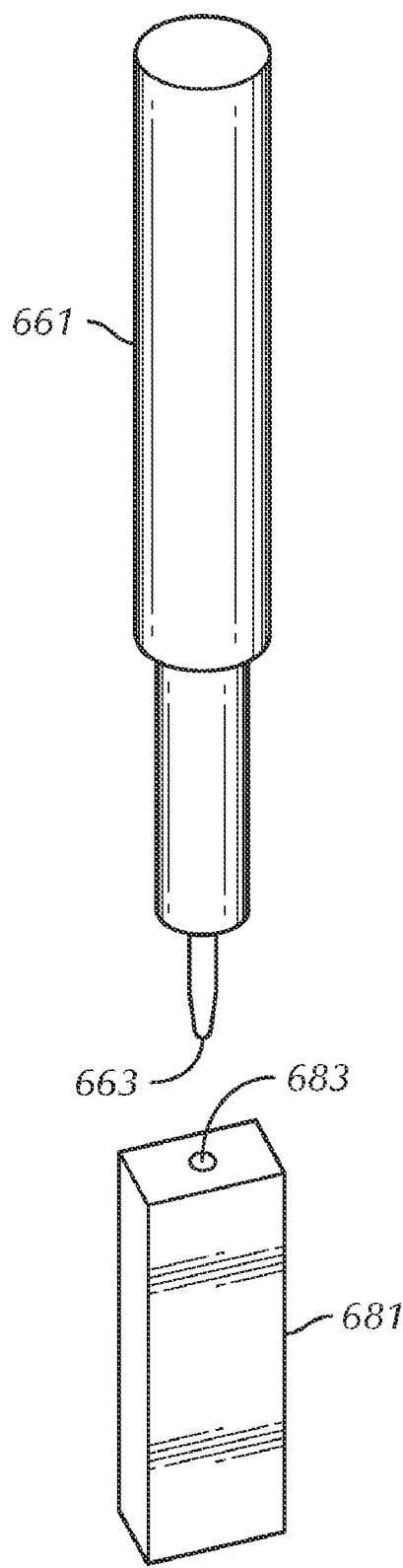
FIG. 6 is a perspective view of a dimple punch and die of the present invention.

FIG. 6 illustrates a dimple punch 661 and a die 681 which can be used to fabricate the present invention. The combination of dimple punch 661 and die 681 can be referred to as a dimple punch and die set. A rounded tip 663 of the dimple punch is aligned over a hole 683 in die 681. To form a dimple in a workpiece (not shown), such as a gimbal substrate, the substrate is held down, or clamped, to die 681 using a pressure pad (not shown). Dimple punch 661 is then punched into the substrate and over die 681, thereby forming a dimple in the substrate.

Figure 7A:
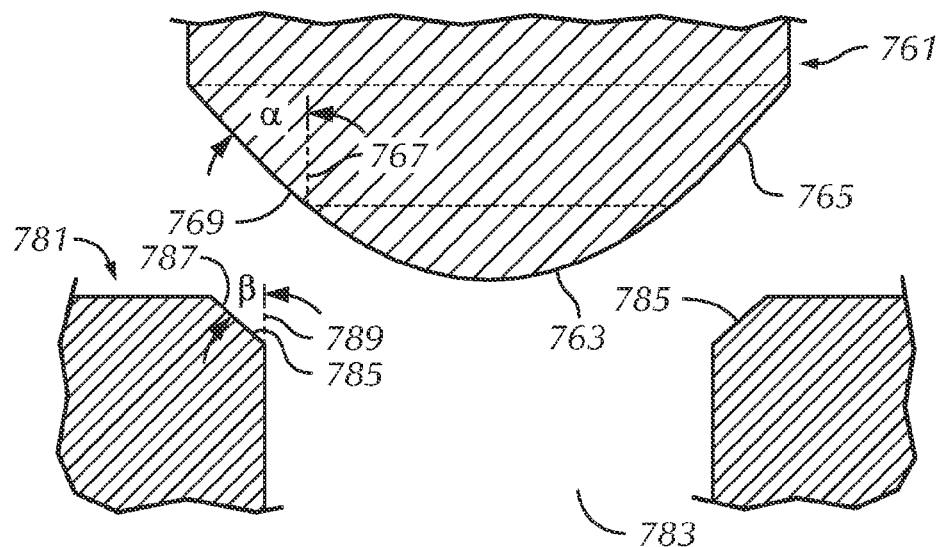
FIG. 7A is a cross-section of a dimple punch and die which can be used to fabricate a dimple in accordance with the first aspect of the present invention.

FIG. 7A is a cross-section of a dimple punch and die which can be used to fabricate a dimple in accordance with the first aspect of the present invention. A dimple punch 761 can have a rounded tip 763. The rounding can be a generally spherical radius. The rounding at the tip can smoothly transition to a tapered body 765. The angle between a longitudinal axis 767 of dimple punch 761, shown here away from the centerline of the punch, and a longitudinal line 769 along the surface of tapered body 765 is called a punch tangent angle, indicated by $\alpha$. The punch tangent angle may also be referred to as a punch taper angle.

A die 781 has a hole 783. The hole has a chamfer 785. The chamfer has a chamfer angle, here indicated by $\beta$, defined as the angle between a chamfer surface 787 and a longitudinal line 789 down the side of the hole. A chamfer may also refer to a bezel, countersink, or faceted fillet.

One method of fabricating the present invention involves providing a punch with a punch tangent angle $\alpha$ and a die with a differing chamfer angle β. For example, a dimple punch with a punch tangent angle α of 52 degrees (deg) is provided, and a die with a chamfer angle β of 45 degrees is provided. The result is a difference in angles α and β of 7 degrees.

Dimple punches with other punch tangent angles may be provided, such as those with 45 degrees, 18 degrees, or 0 degrees (flat). Similarly, dies with other chamfer angles may be provided, such as those with 30 degree chamfer angles, or chamfer angles between 25 and 65 degrees. Differences between a punch tangent angle and a chamfer angle of at least 2 degrees, at least 5 degrees, between 5 and 10 degrees, or greater can be used. A difference of 7 degrees can give a smooth, reflective surface.

Figure 7B:
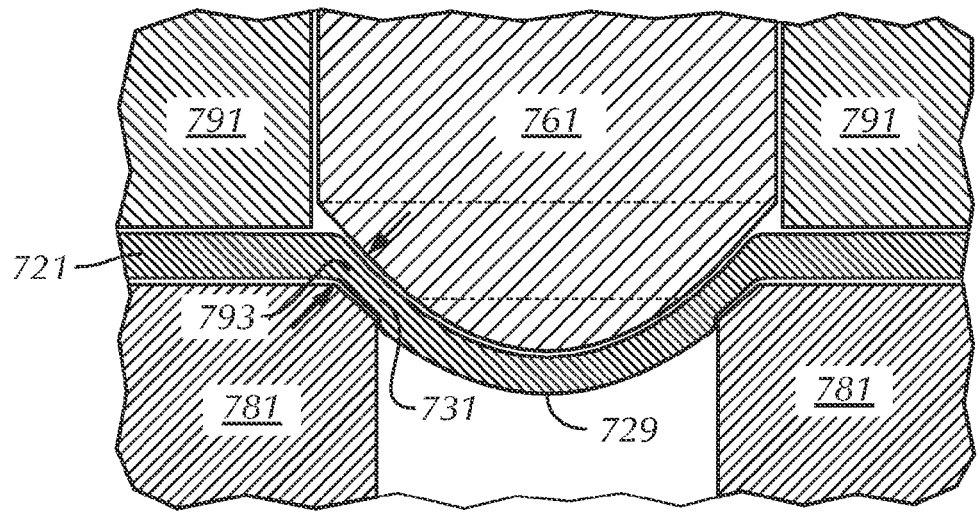
FIG. 7B is a cross-section of the dimple punch and die of FIG. 7A with the dimple punch moved down, and a pressure pad and a substrate shown.

FIG. 7B shows the punch and die of FIG. 7A with dimple punch 761 moved down toward die 781, and a pressure pad 791 (which may surround the punch as shown) and a substrate 721 shown. FIG. 7B illustrates a theory of what happens when a punch tangent angle α and a die chamfer angle β are different. The difference in angles α and β creates a pinched area 793 (indicated as the area between the arrows) during the end of the downward stroke of dimple punch 761. This pinched area restricts the plastic deformation of the substrate metal, resulting in the metallurgical process known as coining. Coining is a form of precision stamping which causes metal to plastically flow under compression and can be done at room temperature. There is relatively good coining contact at base 731 of the dimple, and the coining feathers out as compressive stresses travel up the dimple toward apex 729.

It is believed that a punched dimple is formed in tension which opens up the grain of the material. In the present invention, the punching creates compression around a small part of the dimple or periphery, yielding a smooth, shiny surface. Unlike with the broad compression over the face of the dimple when using a blind hole die, there is no squirting of the metal into recesses between the dimple punch and pressure pad. Instead, the dimple is stretched causing a shine on the inside of the dimple and possibly a slight orange peel effect on the outside of the dimple. The result is crisp, clean, reflective ring on the inside and outside of the dimple.

In addition to producing a shiny ring on a dimple, the use of a mismatched punch tangent angle and chamfer angle helps center the dimple punch in the hole.

Figure 8A:
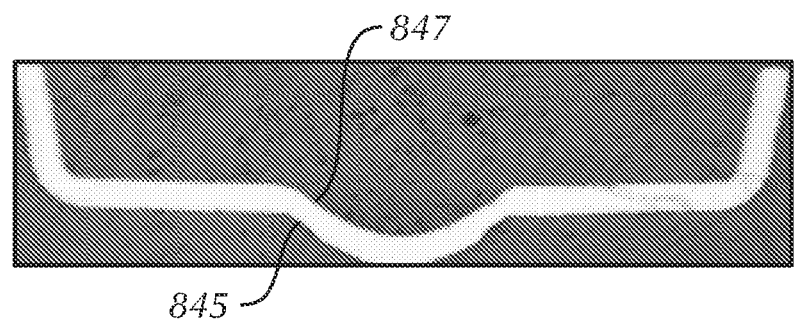
FIG. 8A is a micro photograph showing a cut-away side view of a dimple on a head suspension in accordance with the first aspect of the present invention.

FIG. 8A is a micro photograph showing a cut-away side view of a dimple on a head suspension in accordance with the first aspect of the present invention. Note a generally straight outer incline 845 and generally straight inner incline 847 in the base of the dimple. The inner and outer incline angles differ in accordance with the invention.

Figure 8B:
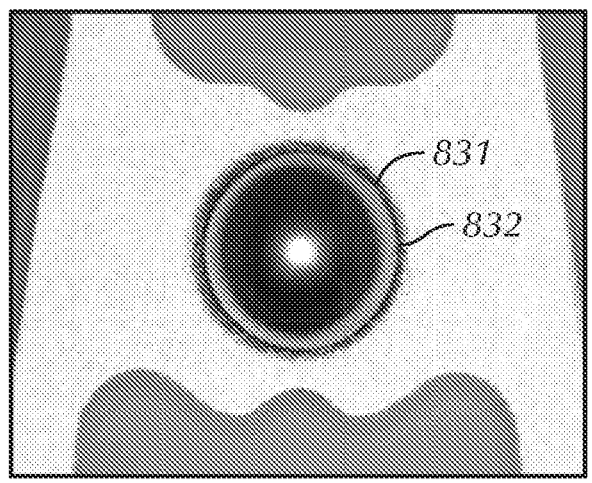
FIG. 8B is a micro photograph showing a plan view of the recessed side of a dimple on a head suspension in accordance with the first aspect of the present invention.

FIG. 8B is a micro photograph showing a plan view of the recessed side of a dimple on a head suspension in accordance with the first aspect of the present invention. Dimple base 831 has a shiny coined surface 832. Shiny surface 832, which forms a ring when viewed from above, can help optical systems pinpoint the precise center of the dimple.

Figure 9:
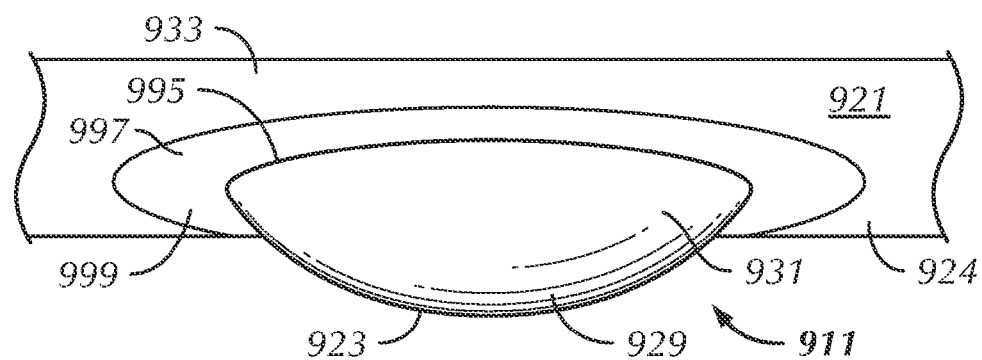
FIG. 9 is a perspective view of a dimple and its periphery on a head suspension according to a second aspect of the present invention.
Figure 10A:
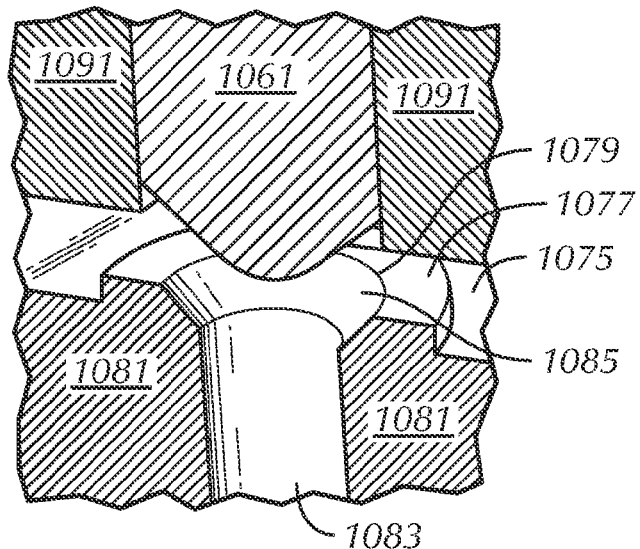
FIG. 10A is an isometric cross-section of a dimple punch, die, and pressure pad which can be used to fabricate a dimple in accordance with the second aspect of the present invention.
Figure 10B:
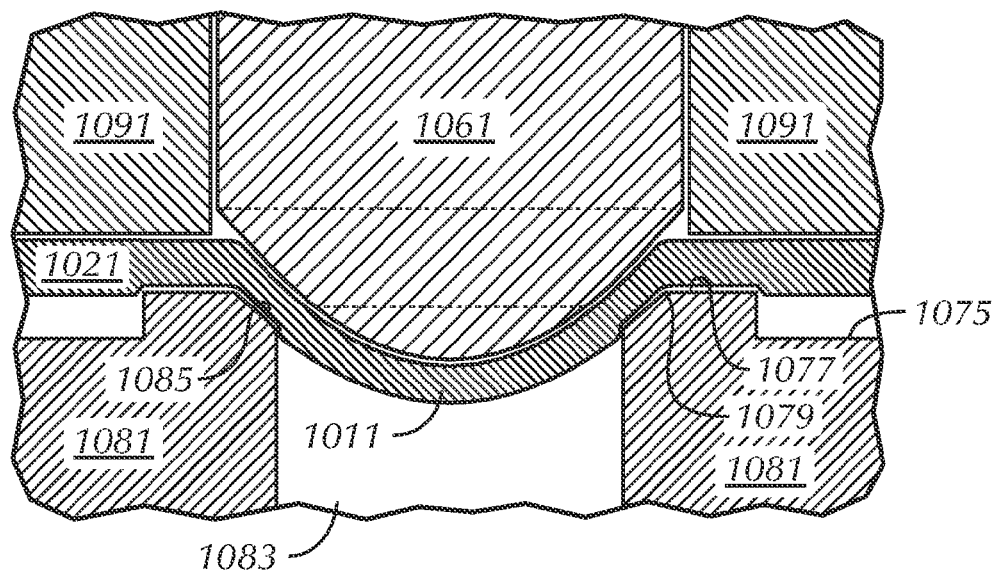
FIG. 10B is a cross-section of the dimple punch, die, and pressure pad of FIG. 10A and additionally showing a gimbal substrate, with the dimple punch moved downward.
Figure 11:
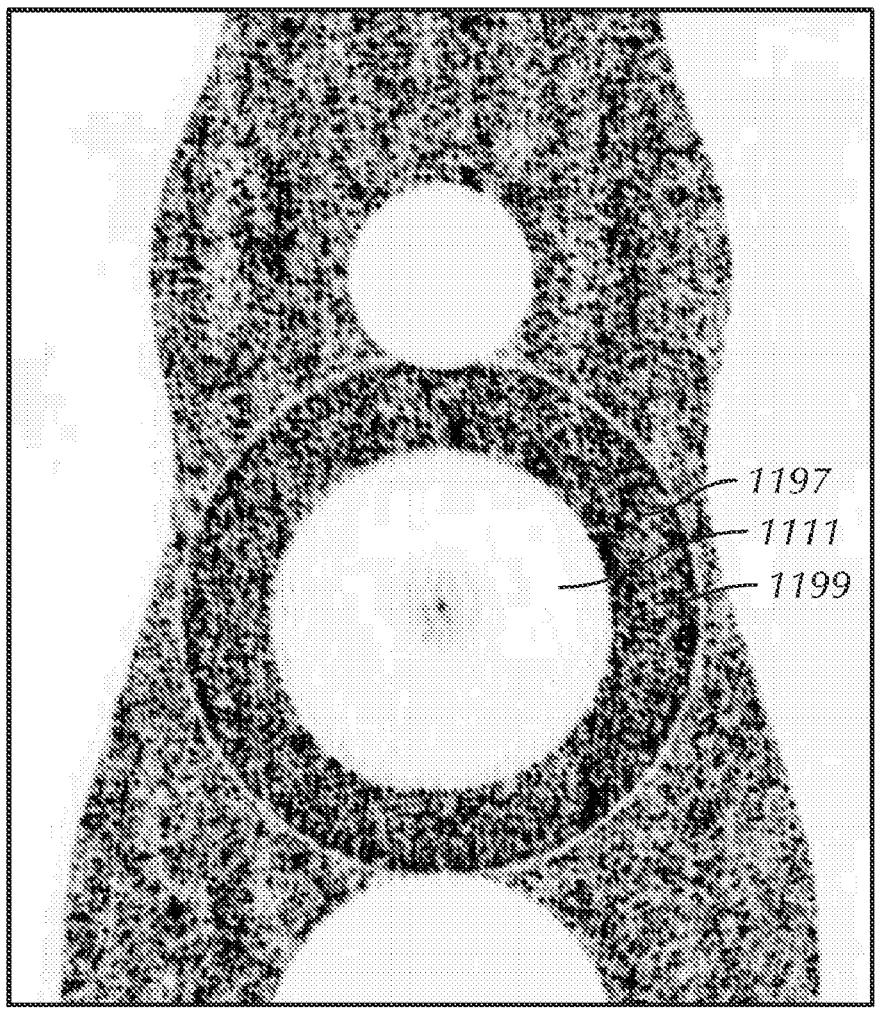
FIG. 11 is a negative micro photograph showing a plan view of the protruding side of a dimple on a head suspension load beam in accordance with the second aspect of the present invention.

FIGS. 9-11 illustrate a second aspect of the invention, described in detail below.

FIG. 9 is a perspective view of a dimple 911 in a gimbal substrate 921 on a head suspension according to the second aspect of the present invention. As with the dimple of the first aspect, this dimple has a protruding side 923 and a recessed side (not shown). Dimple 911 is located on a first side 924 of substrate 921. Dimple 911 includes an apex 929 and a base 931.

Circumference 995 of dimple 911 is defined by the threshold between base 931 and the surrounding relatively flat area of substrate 921. The circumference may also be called a perimeter, especially when the circumference deviates substantially from a circular form. Circumference 995 may be difficult to locate exactly because of a rounded or relatively indefinite transition between the dimple and the plane of the substrate. If circumference 995 is difficult to locate, then circumference 995 can be defined as a locus of points along dimple 911's protruding surface, each point of the locus located at the point of inflection of a radial line. That is, circumference 995 is where the convex surface on protruding side 923 of dimple 911 turns concave to form a fillet with the surrounding surface.

Directly outside of circumference 995 is periphery 933 of dimple 911. Periphery 933 generally surrounds dimple 911. On periphery 933 is a coined region 997.

Entire coined region 997, or a section of coined region 997, can be visibly distinct on its surface from the surrounding features as to define a witness mark 999. A witness mark is a punch mark or scratch used to position or align a part. Witness mark 999 can aid in the alignment of dimple 911 with other components, such as a slider (not shown).

In this second aspect of the present invention, the coined region preferably extends from the circumference outward by at least 0.025 millimeters (mm) (0.0010 inches). It can extend out from the circumference to 0.076 mm (0.0030 inches) to 0.0089 mm (0.0035 inches), out to 0.13 mm (0.0050 inches), or farther. The coined region can be a minimal or a substantial depth into the substrate thickness, but is preferably 0.005 mm (0.0002 inches) to 0.008 mm (0.0003 inches) deep in a 0.030 mm (0.0019 inches) thick substrate material. The ranges above have been found to produce good results, including low average surface roughness (Ra) and relatively good peak-to-valley (PV) flatness.

The coined region can take any shape or may be annular. The ring may be generally annular, such as one whose inner and/or outer perimeter deviates from a circle's circumference by 20% of the circle's radius or less.

FIG. 10A is an isometric cross-section of a dimple punch 1061, die 1081, and pressure pad 1091 which can be used to fabricate a dimple in accordance with the second aspect of the present invention. A substrate is not shown. A raised coining surface 1077, sometimes called a stinger or striker, protrudes from a recessed die surface 1075 around a hole 1083 in die 1081. Hole 1083 has a hole perimeter 1079.

Raised coining surface 1077 extends from hole perimeter 1079 outward preferably by at least 0.025 mm (0.0010 inches). It can extend out from the hole perimeter to 0.076 mm (0.0030 inches) to 0.089 mm (0.0035 inches), out to 0.13 mm (0.0050 inches), or farther.

Raised coining surface 1077 can be tall or short, but is preferably 0.0025 mm (0.0001 inches) to 0.050 mm (0.0020 inches) tall, or more preferably 0.008 mm (0.0003 inches) to 0.038 mm (0.0015 inches) tall.

Hole 1083 can be generally cylindrical, such as formed by drilling. Hole perimeter 1079 can be generally circular, such as formed by drilling a hole perpendicular to a relatively flat surface.

Hole 1083 can be a through hole as shown, or may be a blind hole. Hole 1083 may or may not have a chamfer 1085.

FIG. 10B is a cross-section of the dimple punch 1061, die 1081, pressure pad 1091 of FIG. 10A, and additionally showing a gimbal substrate 1021, with dimple punch 1061 moved downward. FIG. 10B illustrates a theory of what happens when a dimple 1011 is formed out of substrate 1021 which is clamped with pressure pad 1091 against die 1081 with a raised coining surface 1077. The pressure exerted by the outermost part of dimple punch 1061 adds to the pressure of the pressure pads to coin the material in the dimple periphery. The surfaces in the coined region stay relatively flat as they tend to conform to the tooling. The material which would normally deform through paths of least resistance and deform the substrate is forced through a more homogeneous cross section of the coined region, constrained by raised coining surface 1077. The result is a periphery of the dimple in which distortion is largely eliminated.

FIG. 11 is a negative micro photograph showing a plan view of the protruding side of a dimple 1111 on a head suspension load beam in accordance with of the present invention. Coined region 1197 is easily visible on the surface as witness mark 1199. A low average surface roughness (Ra) typically results in a shiny surface. In this sample, the Ra in the dimple periphery was less than 0.8 micrometers (μm). A similar sample, produced without a raised coining die surface, had an Ra of 2.0 μm. The improvement in Ra is more than two fold.

It can be important to maintain the flatness of a gimbal substrate. Flatness is important in a load beam because deviation from flatness affects the height of a lift tab at the end of a head suspension. Variable heights of lift tabs are undesirable because they add to tolerance buildup at component and assembly levels. Flatness is important in flexures because deviations from flatness affect the mounting orientation of sliders with respect to the rest of the head suspensions. Improper mounting orientations can result in nonconforming, rejected parts.

FIGS. 12-15 will be used to compare the flatness around a sample dimple in accordance with the present invention with the flatness around a control dimple. Those figures represent plots of the heights of the surface surrounding the dimple, as measured. The dimple itself has been masked out for the sake of clarity and analysis.

Figure 12:
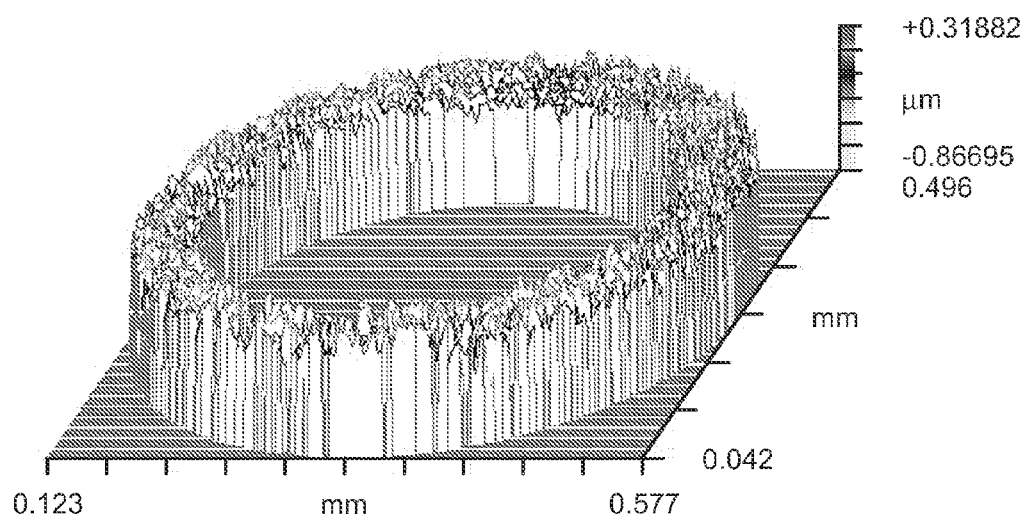
FIG. 12 is an oblique plot of the surface of a coined periphery around the protruding side of a sample dimple formed in accordance with the present invention.
Figure 13:
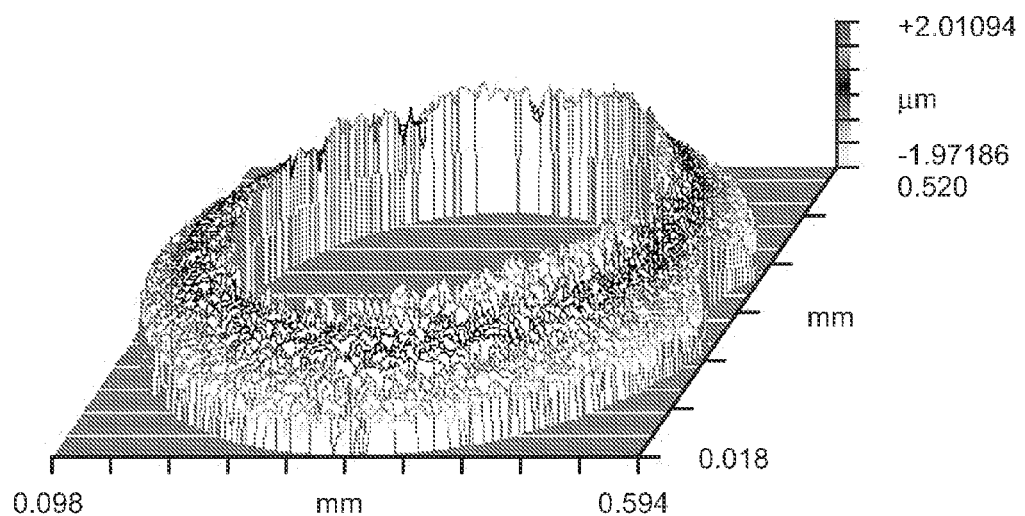
FIG. 13 is an oblique plot of the surface of a non-coined periphery around the protruding side of a control dimple.

FIG. 12 is an oblique plot of the surface of a coined periphery around the protruding side of a sample dimple formed in accordance with the present invention. The surface is relatively flat, with a peak-to-valley (PV) flatness of 1.2 μm. FIG. 13 is an oblique plot of the surface of a non-coined periphery around the protruding side of a control dimple. The surface bends upward toward the dimple, with a PV flatness of 4.0 μm. The improvement in flatness on the coined periphery is greater than 3 fold.

Figure 14:
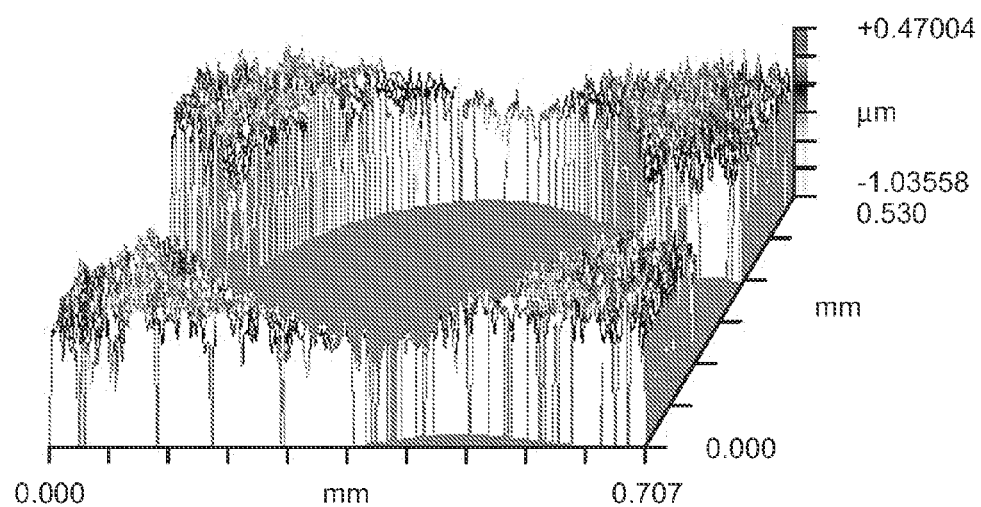
FIG. 14 is an oblique plot of the surface outward from a coined periphery around the protruding side of a sample dimple formed in accordance with the present invention.
Figure 15:
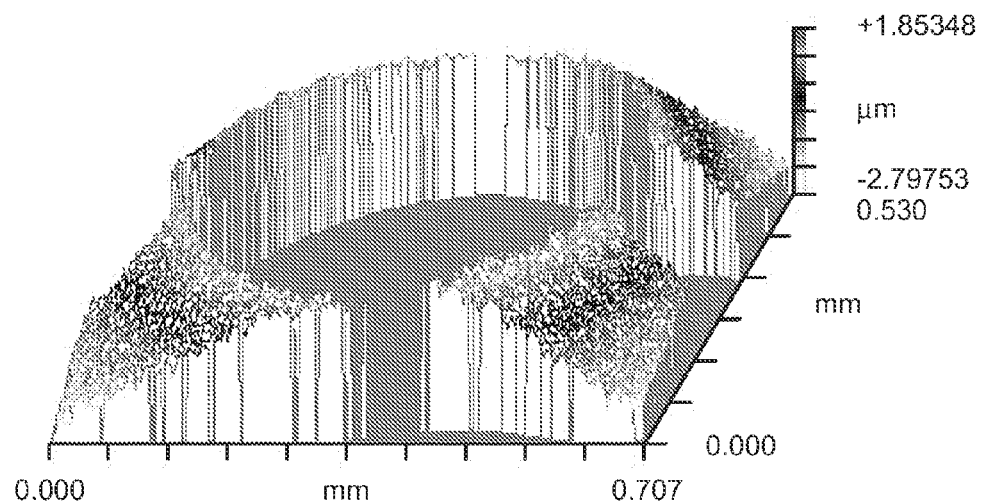
FIG. 15 is an oblique plot of the surface outward from a non-coined periphery around the protruding side of a control dimple.

The flatness in the dimple periphery translates to a flatness in the area outside the periphery. FIG. 14 is an oblique plot of the surface outward from a coined periphery around the protruding side of a sample dimple formed in accordance with the present invention. The surface is relatively flat, like that of the periphery, with a PV flatness of 1.5 μm. FIG. 15 is an oblique plot of the surface outward from a non-coined periphery around the protruding side of a control dimple. The surface bends upward toward the dimple, and has a PV flatness of 4.6 μm. The improvement in flatness in the area outward from the periphery is greater than 3 fold. The opposing, recessed side around the dimple has a similar improvement in flatness.

It has been observed that flatness is improved at greater distances from the dimple, all the way to the lift tab. In one coined sample, the flatness along a longitudinal line of a load beam was approximately within ±1 μm. In a non-coined sample, the flatness deviated by more than ±5 μm. The improvement in flatness along the load beam was greater than 5 fold.

It will be appreciated that the term "present invention" as used herein should not be construed to mean that only a single invention having a single essential element or group of elements is presented. Similarly, it will also be appreciated that the term "present invention" encompasses a number of separate innovations which can each be considered separate inventions. Although the present invention has thus been described in detail with regard to the preferred embodiments and drawings thereof, it should be apparent to those skilled in the art that various adaptations and modifications of the present invention may be accomplished without departing from the spirit and the scope of the invention. Accordingly, it is to be understood that the detailed description and the accompanying drawings as set forth hereinabove are not intended to limit the breadth of the present invention, which should be inferred only from the following claims and their appropriately construed legal equivalents.

What is claimed is:

1. A head suspension having differing internal and external angles within a dimple for use in a disk drive comprising:
    a gimbal substrate; and
    a gimbal dimple protruding from said substrate, said dimple having a base having:
        a generally frusto-conical outer surface having an associated half-cone angle; and
        a generally frusto-conical inner surface having an associated half-cone angle;
        wherein said outer surface is disposed directly opposite said inner surface, and said outer surface half-cone angle is different from said inner surface half-cone angle by at least 2 degrees.

2. The head suspension of claim 1 wherein said substrate between said outer surface and said inner surface is coined such that at least one of said surfaces reflects as a bright ring for use with an optical system that aligns a slider to said dimple.

3. The head suspension of claim 1 wherein said outer surface half-cone angle is different from said inner surface half-cone angle by at least 5 degrees.

4. The head suspension of claim 3 wherein said outer surface half-cone angle is different from said inner surface half-cone angle by between 5 and 10 degrees.

5. The head suspension of claim 4 wherein said outer surface half-cone angle is different from said inner surface half-cone angle by about 7 degrees.

6. The head suspension of claim 1, wherein said gimbal substrate is part of a load beam.

7. The head suspension of claim 1, wherein said gimbal substrate is part of a flexure.

8. The head suspension of claim 1, wherein said base of said dimple is coined.

9. A hard disk drive comprising the head suspension of claim 1, and further comprising a slider and a data storage disk, said head suspension supporting said slider in close proximity to said disk.

10. The head suspension of claim 1, produced according to the method of:
    providing said gimbal substrate;
    providing a dimple punch having a punch tangent angle;
    providing a die having a hole therein, said hole having a chamfer, said chamfer having a chamfer angle, wherein said punch tangent angle differs from said chamfer angle by at least 2 degrees;
    punching said dimple punch into said substrate and over said die, thereby forming said dimple having said base having said outer surface half-cone angle different from said inner surface half-cone angle by at least 2 degrees and directly opposite therefrom.

11. The head suspension of claim 10 wherein said hole in said die is a through hole.

12. The head suspension of claim 10 produced according to the method which further comprises coining said substrate on a circumference within said dimple, the difference in the punch tangent angle and chamfer angle producing the coining.

13. A head suspension for use in a disk drive comprising:
   a gimbal substrate; and
   a gimbal dimple protruding from said substrate, said dimple having a protruding side, a recessed side, and a cross-section, said cross-section having:
      a generally straight inner incline on said recessed side, the inner incline having an inner incline angle; and
      a generally straight outer incline on said protruding side, the outer incline having an outer incline angle, said outer incline disposed directly opposite said inner incline;
      wherein said inner incline angle is different from said outer incline angle by at least 2 degrees.

14. The head suspension of claim 13 wherein said inner incline angle is different from said outer incline angle by at least 5 degrees.

15. The head suspension of claim 14 wherein said inner incline angle is different from said outer incline angle by between 5 and 10 degrees.

16. The head suspension of claim 15 wherein said inner incline angle is different from said outer incline angle by about 7 degrees.

17. A method of producing a head suspension for use in a disk drive comprising:
   providing a gimbal substrate;
   providing a dimple punch having a punch tangent angle;
   providing a die having a hole therein, said hole having a chamfer, said chamfer having a chamfer angle, wherein said punch tangent angle differs from said chamfer angle by at least 2 degrees; and
   punching said dimple punch into said substrate and over said die, thereby forming a dimple having a base having a generally frusto-conical outer surface having an associated half-cone angle and a generally frusto-conical inner surface having an associated half-cone angle, said outer and inner surfaces being disposed directly opposite each other, said outer surface half-cone angle being different from said inner surface half-cone angle by at least 2 degrees.

18. The method of producing a head suspension according to claim 17 wherein:
   said outer surface half-cone angle is different from said inner surface half-cone angle by about 7 degrees;
   said hole in said die is a through hole;
   said gimbal substrate is part of a load beam; and
   said method further comprises coining said substrate on a circumference within said dimple, the difference in the punch tangent angle and chamfer angle producing the coining.

* * * * *